(12) United States Patent
Kehlstadt et al.

(10) Patent No.: US 8,148,954 B1
(45) Date of Patent: Apr. 3, 2012

(54) RAPIDLY CHARGING SUPER CAP BASED RECHARGEABLE DEVICE

(75) Inventors: Florian Kehlstadt, Aclens (CH); Yves Karcher, Cully (CH); Tim O'Sullivan, County Cork (IE); Fabiano Pedrotta, Romanel-sur-Morges (CH)

(73) Assignee: Logitech Europe S.A., Morges (CH)

( * ) Notice: Subject to any disclaimer, the term of this patent is extended or adjusted under 35 U.S.C. 154(b) by 818 days.

(21) Appl. No.: 12/124,096

(22) Filed: May 20, 2008

(51) Int. Cl.
*H01M 10/46* (2006.01)
(52) U.S. Cl. ....................................... 320/166
(58) Field of Classification Search .................. 320/107, 320/116, 166, 167; 307/10.1, 66
See application file for complete search history.

(56) References Cited

U.S. PATENT DOCUMENTS

| | | | | |
|---|---|---|---|---|
| 6,434,032 | B1 * | 8/2002 | Romano ........................ | 320/113 |
| 2005/0253553 | A1 * | 11/2005 | Phillips et al. ................ | 320/112 |
| 2007/0236180 | A1 * | 10/2007 | Rodgers ........................ | 320/115 |
| 2008/0014827 | A1 * | 1/2008 | Amireh et al. ................. | 446/58 |
| 2009/0140575 | A1 * | 6/2009 | McGee et al. ................. | 307/66 |

OTHER PUBLICATIONS

"LTC3811 High Speed Dual, Multiphase Step-Down DCIDC Controller," Linear Technology Corporation, Milpitas, CA (2007).
Barrade "Series Connection of Supercapacitors: Comparative Study of Solutions for the Active Equalizaiton of the Voltages," 7th International Conference on Modeling and Simulation of Electric Machines, Converters and Systems, Montreal, Canada (Aug. 2002).
Cerovsky et al., "DC-DC Converter for Charging and Discharging Super-Capacitors Used in Electric Hybrid Cars," Czech Technical University, Prague, Czech Republic, 8 pages (2003).
Destraz et al., "A New Interleaved Multi-channel DCIDC Converter Specially Dedicated to Low Voltage, High Current Applications," International Exhibition & Conference for Power Electronics, Intelligent Motion and Power Quality, 2006, Nuremberg, Germany (Jun. 2006).
Li et al., "Design and Implementation of a Hybrid Energy Supply System for Railway Vehicles," 20th Annual IEEE Applied Power Electronics Conference and Exposition, APEC 2005, pp. 474-480 (Mar. 2005).
Mindl "Hybrid, Drive Super-Capacitor Energy Storage Calculation," CVUT FEL—Research Centre of JB, Czech Republic, 4 pages (2003).
Rufer et al., "A Supercapacitor-Based Energy-Storage Substation for Voltage-Compensation in Weak Transportation Networks," IEEE Transactions on Power Delivery 19:629-636 (Apr. 2004).
Thounthong et al., "Fuel Cell and Supercapacitors for Automotive Hybrid Electrical System," ECTI Transactions on Electrical Eng., Electronics and Communications, 3:20-30 (Feb. 2005).
Zhiping "Study on Super-capacitor Energy Storage Technology and its Application in Power System," Proceedings of Powercon 2006 (Oct. 2006). (see maybe the Institute of Electrical Engineering, China Academy of Science).

* cited by examiner

*Primary Examiner* — Edward Tso
(74) *Attorney, Agent, or Firm* — Kilpatrick Townsend & Stockton LLP

(57) ABSTRACT

A super-capacitor-powered device is quickly recharged from an energy buffer incorporated in a USB cradle or USB dongle. That USB energy buffer itself is slowly refilled while it is connected to a USB port. The super-capacitor can be in parallel to a battery. In one embodiment, a facilitated battery changer is provided. A battery swap is performed with a recharged battery in a charger having two battery slots.

19 Claims, 5 Drawing Sheets

RAPIDLY CHARGING SUPER CAP BASED RECHARGEABLE DEVICE

BACKGROUND OF THE INVENTION

The present invention relates to rechargeable devices, and in particular to devices using super-capacitors or facilitated replaceable batteries.

Typically, rechargeable batteries can be removed from a device, such as a computer mouse, and placed in a charger. Alternately, the device itself, such as the mouse, could be placed on a recharging stand for recharging. This can be inconvenient since the mouse is not usable during the time the battery is removed or it is on the recharging stand.

A number of patents show systems for replacing the battery without losing power to the device. These typically include sliding one battery into the slot while pushing the other battery out the other side. See, e.g., U.S. Pat. No. 7,339,349, U.S. Pat. No. 6,936,376, U.S. Pat. No. 6,722,024 and U.S. Pat. No. 5,369,802. A device for automatic replacement of a battery in a hard-to-reach ceiling smoke alarm is shown in U.S. Pat. No. 5,617,079.

Another approach for wireless devices is to use induction power supply. An example of a wireless mouse with an induction power supply is shown in U.S. Pat. No. 6,633,155.

Other devices use super-capacitors, which can be charged up rapidly and hold enough charge to power the device for a short period of time. These devices either use a super-capacitor which is shaped like a battery and used like a battery, or a super-capacitor which is wired into the circuitry of a device. In some examples, the super-capacitor is in parallel with the batteries to provide power when the battery runs out.

Examples include U.S. Pat. No. 6,433,508, published application number 2003-0026092 (light with a super-capacitor), publication number 2007-0015531 (hand-held device with video for interactive movie theater, discussing short charge time in paragraph 0072), U.S. Pat. No. 7,323,849 (quick charging super-capacitor for flashlight), U.S. Pat. No. 6,700,352 (super-capacitors shaped like batteries), and U.S. Pat. No. 6,628,107 (super-capacitor in parallel with battery).

BRIEF SUMMARY OF THE INVENTION

The present invention in one aspect provides a super-capacitor-powered device, such as a mouse. A charging circuit is provided in a USB buffer, so the super-capacitor in the device can be rapidly recharged when the device is connected to the USB buffer.

In one embodiment, the USB buffer is provided in a USB dongle. The buffer or charging circuit includes a super-capacitor as well, which preferably has more (e.g., twice) the capacity of the one in the device to be charged to ensure sufficient energy transfer. The USB dongle, when plugged into the computer port, charges up its super-capacitor. When the USB dongle is subsequently plugged into the portable wireless device, its super-capacitor downloads its power quickly into the super-capacitor of the wireless device.

In one embodiment, a super-capacitor is provided in addition to a battery. The super-capacitor can be charged when the user does not have enough time to dock and leave the device in a charging station. In one embodiment, a docking station includes contacts for both a battery and a super-capacitor. Thus, the super-capacitor is charged when the device is docked for a short time. The user can then use the device, and subsequently dock the device for a longer time to charge the batteries in addition to the super-capacitor.

In one embodiment, an automatic or facilitated battery charger is provided. This gives the outward appearance to the user of rapid recharging, when in fact, one battery is removed and replaced automatically with another battery. In one embodiment, this is accomplished using two slots in the device (such as the mouse) with one slot being empty and the other having the rechargeable battery. This meets up with a similarly configured pair of slots on a charger, with a fresh, recharged battery being in the slot corresponding to the empty slot of the device. A battery swap is performed, with the used battery then being recharged and being ready for the reverse swap at a later period. Alternately, a single slot in the device can be used, with a rotating chamber in the recharger for first accepting the discharged, used battery, then rotating to insert a charged battery.

DETAILED DESCRIPTION OF THE INVENTION

Figure 1:
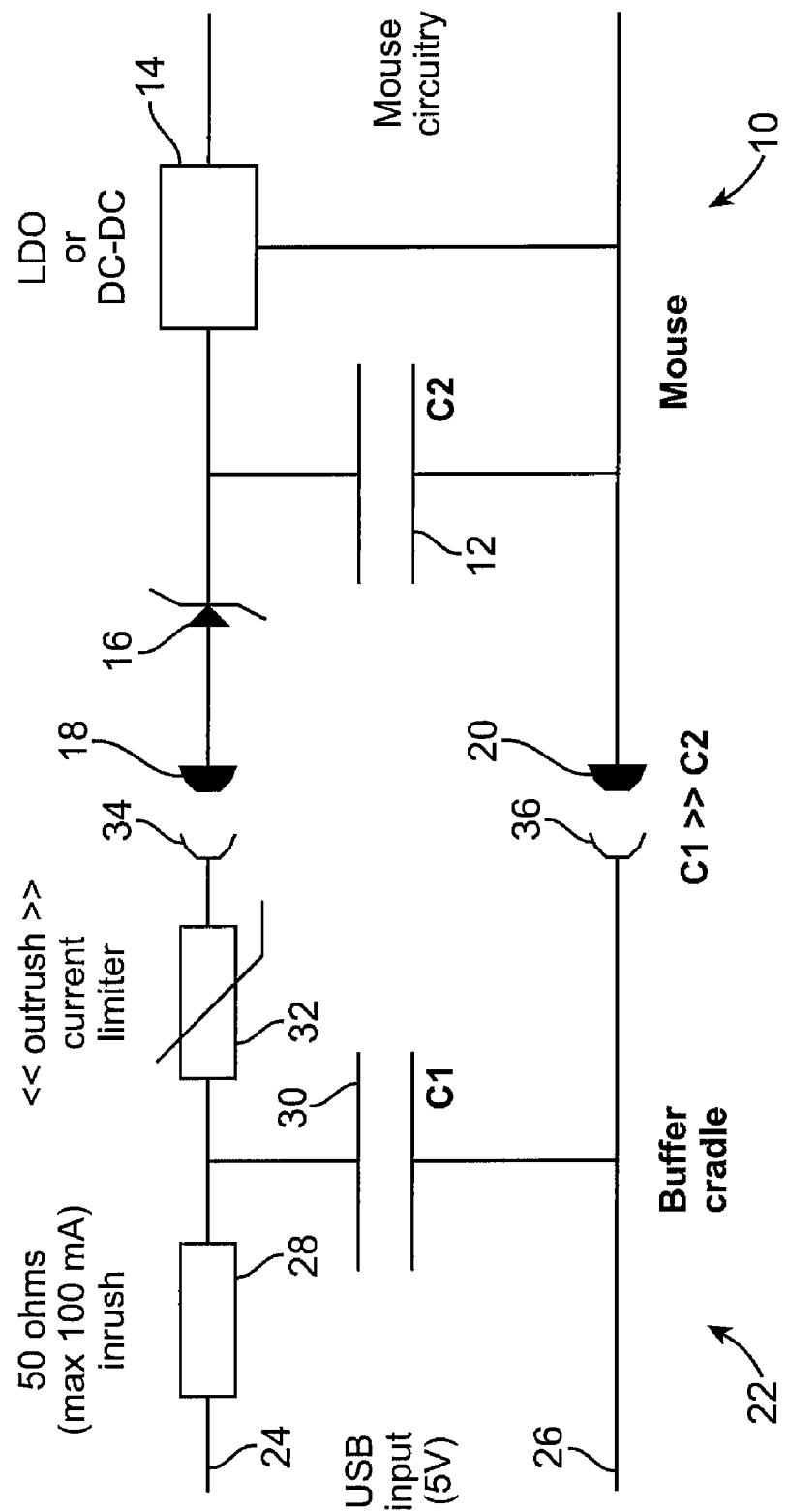
FIG. 1 is a circuit diagram of a charging circuit for a USB buffer to connect to a mouse according to one embodiment of the invention.

FIG. 1 is a diagram of a mouse and buffer charging circuit according to an embodiment of the invention. The wireless device, a mouse in this example, includes a circuit 10 with a super-capacitor 12 for providing power to the mouse circuitry. The electricity from the super-capacitor is provided through a low dropout (LDO) linear regulator or DC-DC converter 14. A rectifier 16 (preferably a Schottky diode) is connected between a first contact 18 and super-capacitor 12. A second contact 20 is also provided.

When the mouse is docked in a charging cradle, it comes in contact with a USB buffer charging circuit 22. The buffer charging circuit is connected to USB leads 24 and 26. A resistor 28 connects to one end of a larger super-capacitor 30. Super-capacitor 30 has more (e.g., twice) the capacity of super-capacitor 12 of the wireless mouse. When the mouse is connected, an outrush current limiter 32 is provided between capacitor 30 and a contact 34 to prevent sparking while allowing an ultrafast recharge after a few tens of milliseconds. A second contact 36 connects with mouse contact 20. Resistor 28 is sized to limit the amount of current drain when charging the super-capacitor 30 so that it remains within the USB specifications.

An advantage of the super-capacitor charging circuit is that there is no voltage issue. In particular, there is no need to step up the buffer voltage to recharge a battery, and no charge circuitry. There is also no permanent current drain from the USB. The current tends toward 0 as soon as the buffer super-capacitor approaches full charge. The circuitry itself is a very simple electronic circuit, with no complicated recharge design required.

An advantage of buffering through a reservoir storage (either made of a supercap or any other electricity storage device) is the ability to slowly accumulate trickle energy from a source that would not be able to deliver a big charge current by itself, and then transfer it, when needed, at a (much) faster rate. Another advantage of the supercap when used both as reservoir capacitor in the buffer and as energy storage in the device is its unique ability to accomplish a very fast delivery (and absorption) of the energy. An ultra fast energy transfer translates into a short docking time, which means a short time the device is unavailable for use.

Figure 2B:
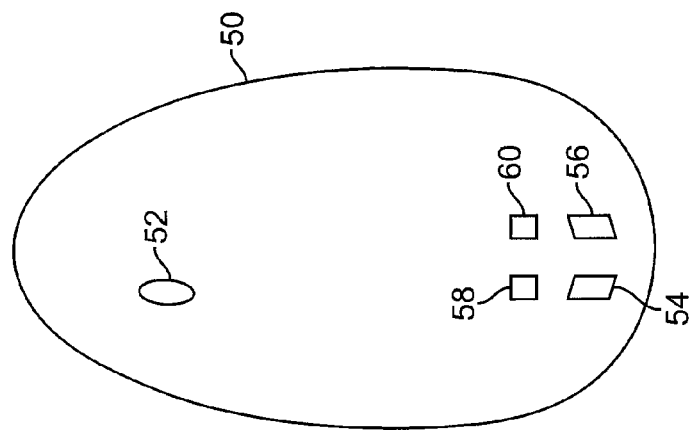
FIGS. 2a, 2b illustrate a charging cradle and mouse, respectively, with multiple contacts for a battery and a super-capacitor according to one embodiment of the invention.
Figure 2A:
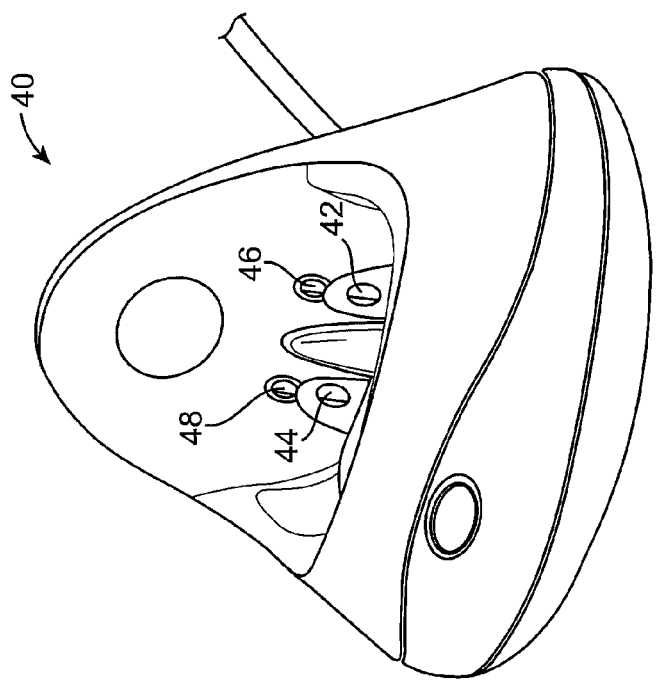

FIG. 2A shows a docking and recharging cradle 40 having battery contacts 42 and 44. In addition, it includes super-capacitor charging contacts 46 and 48.

FIG. 2B shows the bottom of a wireless mouse 50 with an optical sensor 52. It includes battery recharging contacts 54 and 56. In addition, it includes super-capacitor recharging contacts 58 and 60.

In one embodiment, using the mouse and charging cradle of FIG. 2A, both the battery and the super-capacitor are charged at the same time. The user can thus decide to operate with only the super-capacitor being charged by only leaving the mouse in the cradle for a short period of time. This will provide the user with a limited amount of use time for the mouse, until such a time as the user can leave the mouse in the cradle for a longer time to recharge the batteries as well.

In an alternate embodiment, only a single set of contacts are used, with circuitry inside the mouse or other wireless device for providing the charging current to both the batteries and to the super-capacitor. Alternately, the mouse may have only a super-capacitor, with the battery contacts being used to charge the super-capacitor.

Figure 3:
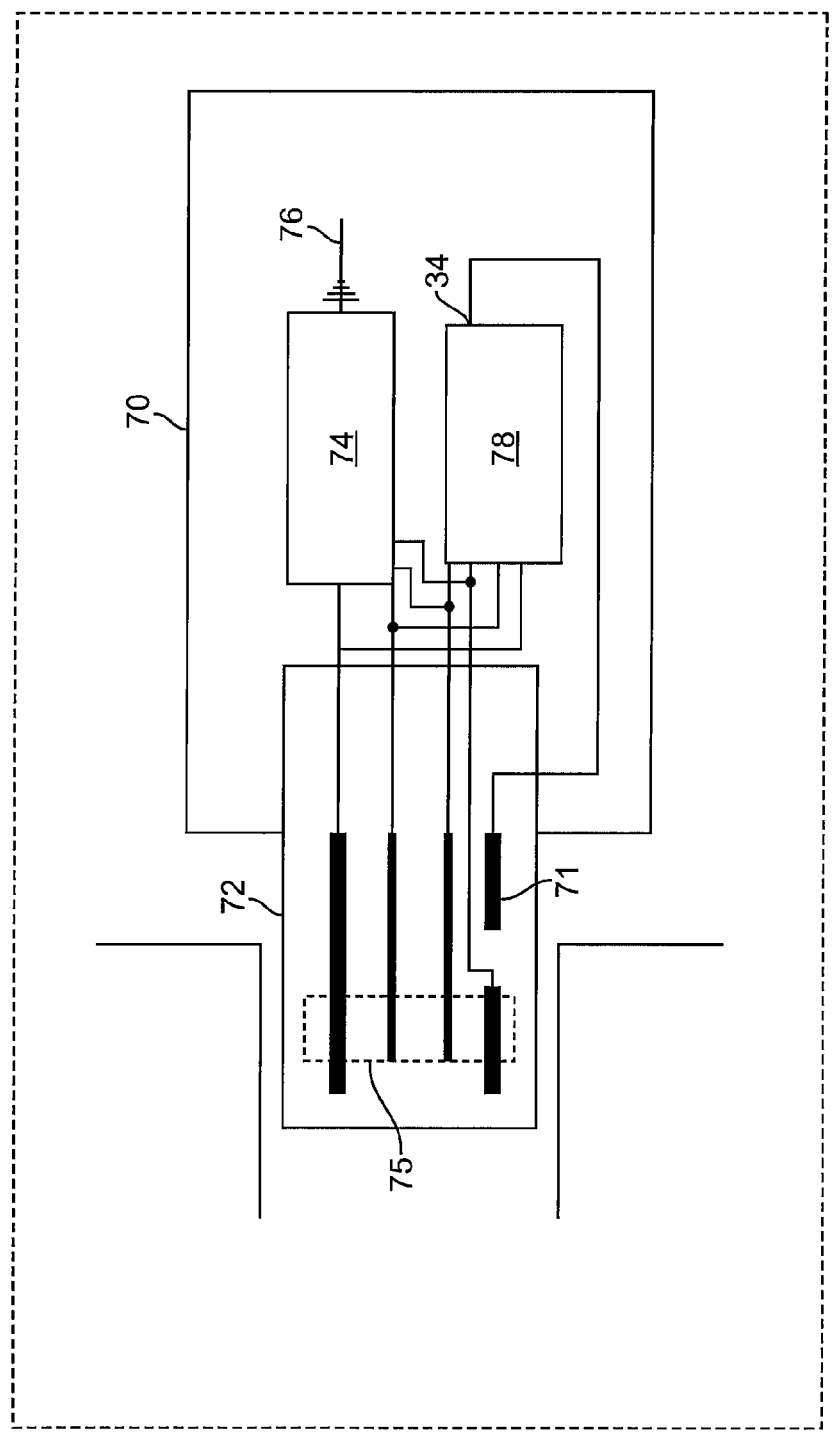
FIG. 3 is a diagram of a USB dongle having both a recharging circuit and a wireless receiver according to one embodiment of the invention.

FIG. 3 shows an embodiment of a USB dongle 70 according to an embodiment of the present invention. The dongle has a USB connector 72 and a wireless receiver circuit 74 with an antenna 76. Such dongles are used to provide wireless reception at the USB port of a computer for a wireless mouse or other input device. Dongle 70 of FIG. 3 in addition includes a super-capacitor recharging circuit 78.

Circuit 78 of FIG. 3 can be the same circuit as circuit 22 of FIG. 1. However, the same USB contact is not used for both charging and discharging. There are technical and USB standards reasons: among others, the USB standard does not allow giving back current or even voltage to an USB port, especially when the PC is OFF or in suspend mode. Instead, the present invention adds a non standard 5th contact 71 in the dongle plug, to connect to discharging contact 34 of the circuit of FIG. 1, from which only a specially designed mouse or other apparatus could take its power. The normal VBus contact 73 connects to charging contact 24 of FIG. 1.

The 5th contact is located behind the normal VBus contact (i.e. deeper in the USB plug) as shown in FIG. 3, where the VBus contact in a standard USB socket has no chance to ever touch it. However, alternate embodiments could put the contact in other positions. Dotted line 75 shows the area where the 4 contacts in a legacy USB socket normally expect to encounter a track on the plug PCB. The 5th contact 71 would only come in contact with a custom socket for the mouse, capable of reaching the contact 71.

Figure 4:
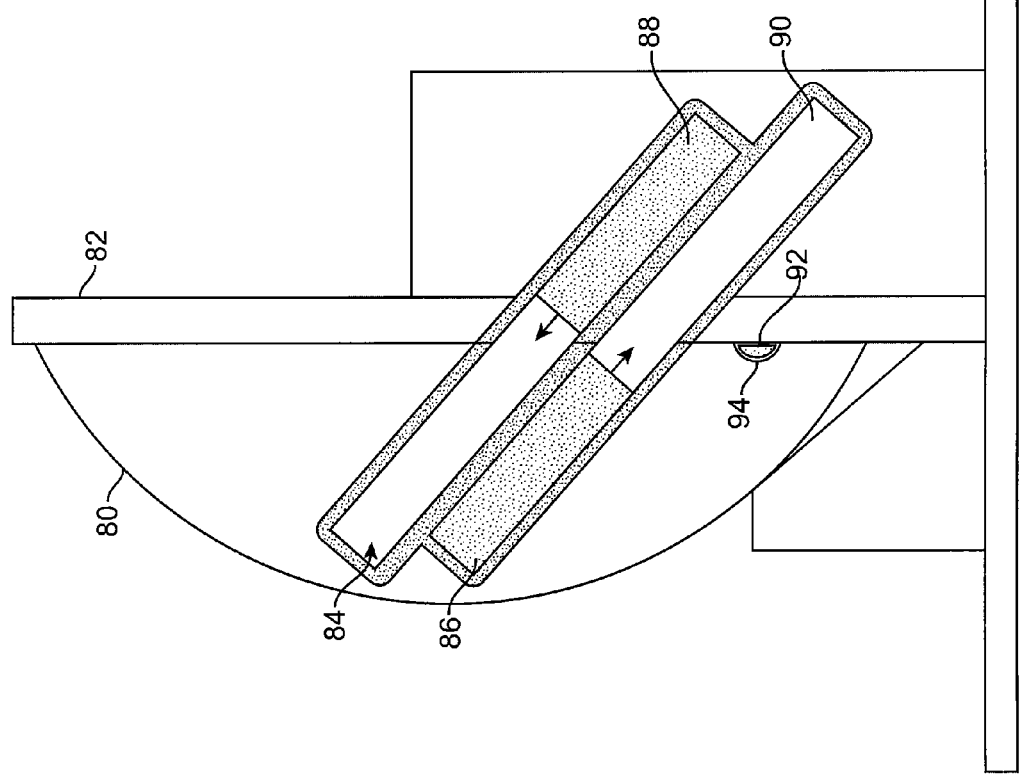
FIG. 4 is a diagram of a mouse and battery swapping cradle with multiple slots according to an embodiment of the invention.

FIG. 4 is a diagram of an embodiment of a wireless mouse and a recharging cradle where the mouse has two receptacles or slots. As shown in FIG. 4, a mouse 80 is inserted into a cradle 82. The mouse has an empty slot 84 and a second slot with a battery 86. The cradle 82 has two slots with the battery 88 in the mirror image, and slot 90 being empty.

When the mouse is connected into the cradle, a protrusion 92 on the cradle engages a release switch 94 on the mouse, which causes battery 86 to be ejected into slot 90. At the same time, a plunger or other mechanism can eject battery 88 into slot 84 of mouse 80. The process can be repeated some time later when battery 86 is charged and battery 88 has run down. At that time, the reverse operation will occur, with battery 88 being ejected from the mouse and battery 86 being injected into the empty slot of the mouse.

In one embodiment, protrusion 92 on charger 82 contacts a quick release battery button 94. Such a button mechanism can be similar to that used on Logitech's G7 gaming mouse, which allows quick release for replacement of batteries. Since it is easier to have the mouse eject the battery than to pull it out with some mechanism on the charger stand, this embodiment takes advantage of that feature on the mouse. The mouse can engage a catch or other restraining mechanism to hold it against the charger so it won't be dislodged by the force of the battery being ejected or injected.

Figure 5:
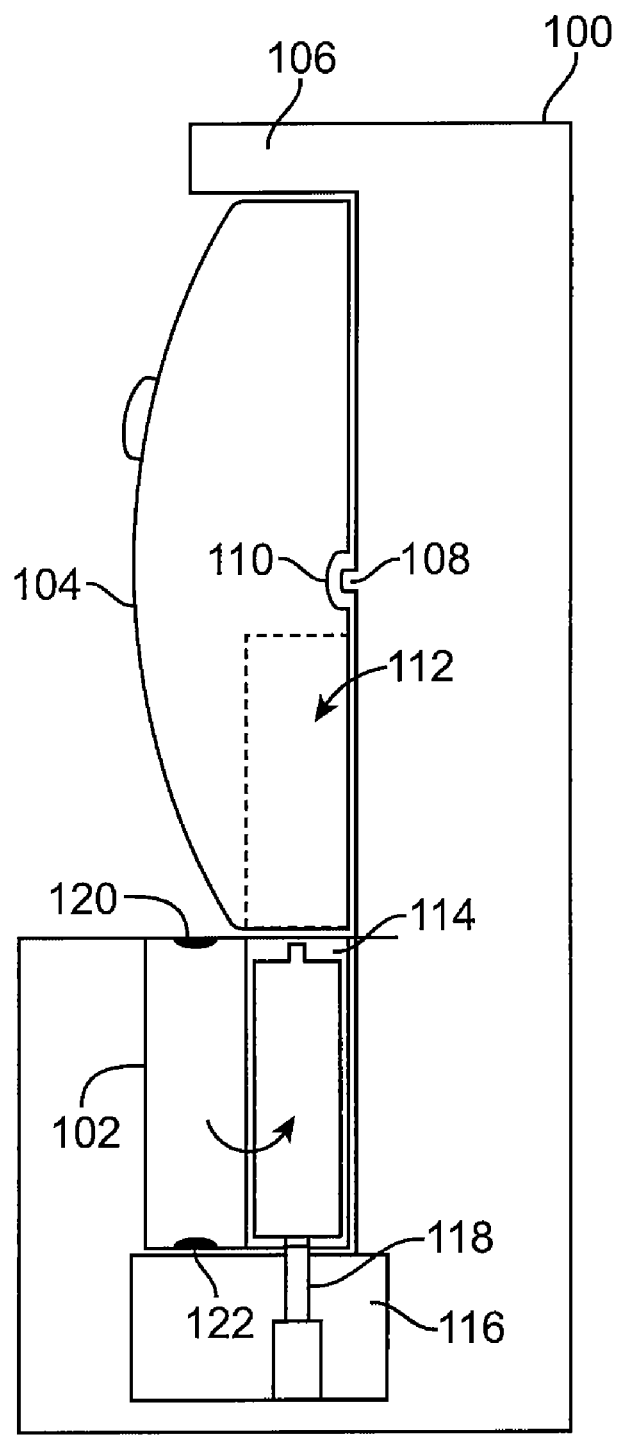
FIG. 5 is a diagram of a mouse and a battery swapping cradle having a rotating chamber according to an embodiment of the invention.

FIG. 5 shows an alternate embodiment of a charger 100 with as rotating barrel 102 having multiple chambers. A mouse 104 is inserted into charger 100, with its nose up against an overhang 106 which holds the mouse in place while a battery is injected or ejected. When the mouse is docked, a protrusion 108 engages a battery release button 110, causing the battery to be ejected from chamber 112 into a chamber 114. A motor 116 then rotates chamber 102, positioning a battery which has been recharged into the chamber below mouse chamber 112. A solenoid plunger mechanism 118, or other mechanical mechanism, then forces the battery into chamber 112 of the wireless mouse 104. As shown, there are electrical contacts 120 and 122 on the left chamber of the rotating chamber 102 for recharging a battery. No contacts are needed for the injection/ejection portion on the right side of rotating chamber 102.

In the embodiments of FIGS. 4 and 5, a spring-released battery cover door covers the openings to the battery chamber on the wireless mouse. In one embodiment, the door can be engaged by a protrusion or pin on the charger to open the door when the mouse is inserted into the chamber. Alternately, battery release button 110 can cause the door to open, as well as ejecting the battery. After the battery has been ejected and a new one injected, upon removal, the pin releases the spring-loaded door, causing it to close. The inside of a spring-loaded door would include one of the contacts for the battery.

As will be understood by those skilled in the art, the present invention may be embodied in other specific forms without departing from the essential characteristics thereof. For example, alternate mechanisms for replacing a battery could be used, such as injecting a battery from one side and causing the battery to be ejected out the other side by the force of the injected battery. Also, although a mouse is described as an example of a device, any other device could be used, such as any human interface device, including a trackball, gamepad, remote control, keyboard, mobile phone, PDA, MP3 player, etc. In addition to the ejection and swapping of legacy batteries or battery packs, the invention can provide for the ejection and swapping of supercaps, or composite elements (packs). A pack can contain a supercap rather than a battery, and incorporate circuitry such as resistor 28 and current limiter 32 in addition to the supercap. This would thus protect the capacitor from unwanted potential shorts. Accordingly, the foregoing description is intended to be illustrative, but not limiting, of the scope of the invention which is set forth in the following claims.

What is claimed is:

1. A system comprising:
   a movable device including a first super-capacitor for providing power to said device;

a USB buffer for connection to a USB port; and
a super-capacitor charging circuit in said USB buffer, said super-capacitor charging circuit including:
an energy storage device; and
an energy delivery element for quickly providing energy from said energy storage device to said first super-capacitor without sparking.

2. The system of claim 1 wherein said movable device is a human interface device.

3. The system of claim 1 wherein said energy delivery element is a current limiter.

4. The system of claim 1 wherein said energy storage device is a second super-capacitor, said second super-capacitor having at least twice the capacity of said first super-capacitor.

5. The system of claim 1 wherein said USB buffer is in a USB dongle.

6. The system of claim 1 wherein said movable device includes a battery in parallel with said super-capacitor.

7. A system comprising:
a human interface device including a first super-capacitor for providing power to said device;
a dongle including a USB buffer for connection to a USB port; and
a super-capacitor charging circuit in said USB buffer, said super-capacitor charging circuit including:
a second super-capacitor, said second super-capacitor having at least twice the capacity of said first super-capacitor; and
a current limiter for quickly providing energy from said second super-capacitor to said first super-capacitor without sparking.

8. A system comprising:
a movable device including a first super-capacitor for providing power to said device;
a charger cradle for docking said human interface device; and
a super-capacitor charging circuit in said charger cradle, said super-capacitor charging circuit including:
an energy storage device; and
an energy delivery element for quickly providing energy from said energy storage device to said first super-capacitor without sparking.

9. The system of claim 8,
wherein said movable device includes a battery in parallel with said super-capacitor;
wherein said human interface device includes an externally accessible pair of battery contacts for recharging said battery, and a pair of super-capacitor contacts for recharging said first super-capacitor; and
said charger cradle including
a first pair of charger contacts, connected to said super-capacitor charging circuit, positioned to engage said pair of super-capacitor contacts on said movable device, and
a second pair of charger contacts positioned to engage said pair of battery contacts on said movable device.

10. A charger for a movable device which includes a first super-capacitor for providing power to said device, said charger comprising:
a USB buffer for connection to a USB port; and
a super-capacitor charging circuit in said USB buffer, said super-capacitor charging circuit including:
an energy storage device; and
an energy delivery element for quickly providing energy from said energy storage device to said first super-capacitor without sparking.

11. The charger of claim 10 wherein said charger is housed in a USB dongle.

12. The charger of claim 11 wherein said USB dongle includes:
four standard USB contacts; and
a fifth contact, recessed from said four standard USB contacts so that said fifth contact does not connect to a standard USB port, said fifth contact being connected to said energy delivery circuit.

13. A charger for a movable device which includes a first super-capacitor for providing power to said movable device, said charger comprising:
a charger cradle for docking said movable device; and
a super-capacitor charging circuit in said charger cradle, said super-capacitor charging circuit including:
an energy storage device; and
an energy delivery element for quickly providing energy from said energy storage device to said first super-capacitor without sparking.

14. A charging device comprising:
a first receptacle for a first energy storage element;
a second receptacle for a second energy storage element;
a charging circuit for charging an energy storage element in at least one of said first and second receptacles;
a first mechanism for injecting an energy storage element from one of said receptacles into a movable device; and
a second mechanism for receiving an energy storage element into one of said receptacles from said movable device.

15. The charging device of claim 14 further comprising
a moving element for alternating the positions of said first and second receptacles such that each of said receptacles can be aligned with an energy storage element chamber in said movable device.

16. The charging device of claim 14 wherein said energy storage element is a rechargeable battery.

17. The charging device of claim 14 wherein said energy storage element is a super-capacitor.

18. The charging device of claim 14 further comprising:
a retaining element for holding said movable device against said charging device against injection and ejection forces of said energy storage element.

19. A charging system comprising:
a movable device including:
a first movable device receptacle for a first energy storage element; and
a second movable device receptacle for a second energy storage element; and
a charger including:
a first charger receptacle aligned with said first movable device receptacle when said movable device is docked with said charger; and
a second charger receptacle aligned with said second movable device receptacle when said movable device is docked with said charger;
a charging circuit for charging an energy storage element in at least one of said first and second charger receptacles;
a first mechanism for injecting an energy storage element from one of said charger receptacles into said movable device; and
a second mechanism for receiving an energy storage element into one of said charger receptacles from said movable device.

* * * * *